Patented Feb. 25, 1936

2,031,913

UNITED STATES PATENT OFFICE 2,031,913

ZINC CHLORIDE BASE FLUX

Edward A. Taylor, Shaker Heights, Ohio, assignor to The Grasselli Chemical Company, Cleveland, Ohio, a corporation of Delaware No Drawing. Application November 3, 1933, Serial No. 696,597

7 Claims. (Cl. 148—26)

The usual zinc chloride fluxes used in the soft soldering of metals, after the soldering operations leave a dark grey or black residue which, by reason of its insolubility, is very difficult to remove.

The present invention is directed to a process and zinc chloride type of soldering flux, which after the soft soldering operation leaves a residue lighter in color and more readily soluble than the residue of the zinc chloride fluxes heretofore known.

I have found that the addition of a relatively small amount of an oxidizing agent to a zinc chloride flux results in the residue after soldering being light in color and relatively easily removable by washing. My invention may be applied to zinc chloride, and zinc chloride and ammonium chloride fluxes generally. The oxidizing agents have the effect of oxidizing the residue which forms as a result of the use of zinc chloride fluxes. Obviously any oxidizing agent may be used which will cause such an oxidation at soldering temperatures.

Various oxidizing agents as alkali metal permanganates, alkali metal dichromates, alkali metal chlorates, alkali metal perchlorates, alkali metal perborates, alkali metal persulfates, and alkali metal nitrates may be used. I have found sodium chlorate and sodium nitrate to be particularly suitable. The oxidizing agents may be dissolved in the flux, or first dissolved in water and the resultant aqueous solution added to the zinc chloride solution.

The amount of oxidizing agent required varies somewhat with the flux used and the color and solubility of the residue one desires. Good results have been obtained using the oxidizing agents in quantities equal to from about ¼ of 1% to about 2% by weight of a concentrated zinc chloride solution.

A 50° Bé. zinc chloride solution, for example, to which is added ¼ of 1% by weight of sodium chlorate leaves, when used as a tinning flux in the usual way, a light colored, readily soluble residue.

A 50° Bé. zinc chloride solution to which I added ¼ of 1% by weight of sodium nitrate left, when used as a tinning flux, a residue not quite as light as when sodium chlorate was used with the flux. The residue is, however, much lighter in color and more soluble than if no oxidizing agent had been used.

Fluxes made according to my invention are used in the same manner as the fluxes heretofore known. After the soldering operation the residue may be removed by washing. Or, in some cases, by reason of its light color the residue may remain without objectionably discoloring the work.

It may appear anomalous to add an oxidizing agent to a flux as it is generally considered that a flux acts to remove the oxide film from the metal to be soldered. However, the quantity of oxidizing agent is so small that even if it attacks the metal to some slight degree the excess of flux generally used prevents any noticeable interference with the fluxing action.

I claim:

1. As a new composition of matter a flux for soft soldering comprising zinc chloride and a small amount of sodium chlorate.

2. As a new composition of matter a soldering flux comprising zinc chloride and a small amount of sodium nitrate.

3. As a new composition of matter a flux for soft soldering comprising zinc chloride and which contains sodium chlorate in an amount equal to about ¼ of 1% by weight of the zinc chloride calculated as a saturated aqueous solution.

4. In a process of soft soldering the step of applying a flux comprising zinc chloride and a small amount of an oxidizing agent, the composition being free from reducing agents whereby the oxidizing agent can exercise an effect on residues of the soft soldering process.

5. In a process of soft soldering the step of applying a flux comprising zinc chloride and a small amount of sodium chlorate.

6. In a process of soft soldering the step of applying a flux comprising zinc chloride and a small amount of sodium nitrate.

7. A flux for soft soldering comprising a zinc chloride flux and a small amount of an oxidizing agent, the composition being substantially free from reducing agents whereby the oxidizing agent can exercise an effect on residues of a soldering operation.

EDWARD A. TAYLOR.